US012436208B2

(12) United States Patent
Slocum et al.

(10) Patent No.: US 12,436,208 B2
(45) Date of Patent: Oct. 7, 2025

(54) METHODOLOGY TO MEASURE SENSITIVE MAGNETIC FIELDS THROUGH COUPLED PUMP/PROBE FIELDS

(71) Applicant: Government of the United States, as represented by the Secretary of the Air Force, Wright-Patterson AFB, OH (US)

(72) Inventors: Michael A. Slocum, Dayton, OH (US); Robert G. Bedford, Beavercreek, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 289 days.

(21) Appl. No.: 18/319,269

(22) Filed: May 17, 2023

(65) Prior Publication Data
US 2023/0393221 A1 Dec. 7, 2023

Related U.S. Application Data

(60) Provisional application No. 63/342,698, filed on May 17, 2022.

(51) Int. Cl.
*G01R 33/032* (2006.01)
(52) U.S. Cl.
CPC ................... *G01R 33/032* (2013.01)
(58) Field of Classification Search
CPC ...................................... G01R 33/032

USPC ........................................ 324/244.1
See application file for complete search history.

(56) References Cited

U.S. PATENT DOCUMENTS

| 9,231,373 | B2 | 1/2016 | Fallahi et al. | |
|---|---|---|---|---|
| 10,083,545 | B2 | 9/2018 | Jeske et al. | |
| 2013/0207649 | A1* | 8/2013 | Mizutani | G01R 33/032 |
| | | | | 324/244.1 |
| 2013/0265042 | A1* | 10/2013 | Kawabata | G01R 33/26 |
| | | | | 324/301 |
| 2014/0320123 | A1* | 10/2014 | Kobayashi | G01R 33/26 |
| | | | | 324/244.1 |
| 2016/0097824 | A1* | 4/2016 | Fujii | G01R 33/0052 |
| | | | | 324/244.1 |
| 2016/0131723 | A1* | 5/2016 | Nagasaka | G01R 33/0206 |
| | | | | 324/244.1 |
| 2017/0211947 | A1* | 7/2017 | Fisk | G01R 33/032 |
| 2022/0136135 | A1* | 5/2022 | Abraham | C30B 33/02 |
| | | | | 324/244.1 |

OTHER PUBLICATIONS

Dumeige, Yannick, et al. "Magnetometry with nitrogen-vacancy ensembles in diamond based on infrared absorption in a doubly resonant optical cavity." Physical Review B—Condensed Matter and Materials Physics 87.15 (2013): 155202. (Year: 2013).*

(Continued)

*Primary Examiner* — Christopher P McAndrew
(74) *Attorney, Agent, or Firm* — AFMCLO/JAZ; John T. Addicks (57) ABSTRACT

Various embodiments are directed to systems, apparatus and methods for measuring sensitive magnetic fields through coupled pump/probe fields associated with an NV diamond material within a resonant cavity while controlling beam power and frequency fluctuations.

18 Claims, 3 Drawing Sheets

(56) References Cited

OTHER PUBLICATIONS

Jan Jeske, et al., "Laser Threshold Magnetometry", New Journal of Physics, Published Jan. 8, 2016; vol. 18 (2016) Jan. 30, 2015.
Georgios Chatzidrosos, et al., "Miniature Cavity-Enhanced Diamond Magnetometer", American Physical Society, Published Oct. 27, 2017; vol. 8.044019 (2017).
Yannick Dumeige, et al., "Infrared Laser Threshold Magnetometry with a NV Doped Diamond Intracavity Etalon", Optics Express, Optical Society of America, Published 2019; vol. 27 (2), pp. 1706-1717; 10.1364/OE.27.001706.

* cited by examiner

METHODOLOGY TO MEASURE SENSITIVE MAGNETIC FIELDS THROUGH COUPLED PUMP/PROBE FIELDS

CROSS REFERENCE TO RELATED APPLICATION

This application claims the benefit of provisional patent application Ser. No. 63/342,698, filed on May 17, 2022, and entitled METHODOLOGY TO MEASURE SENSITIVE MAGNETIC FIELDS THROUGH COUPLED PUMP/PROBE FIELDS, which provisional patent application is incorporated herein by reference in its entirety.

GOVERNMENT INTEREST

The invention herein may be manufactured and used by or for the Government of the United States for all governmental purposes without the payment of any royalty.

FIELD OF THE DISCLOSURE

The present disclosure relates generally to a method and apparatus for measuring sensitive magnetic fields through coupled pump/probe fields.

BACKGROUND

Magnetic field sensing is critical for a variety of applications including detection of direct current (DC) and transient signals in integrated circuits, monitoring of brain activity using magnetoencephalography, and detection of the Earth's magnetic field used in navigation to name only a few.

Nitrogen vacancy (NV) centers in diamond have been demonstrated to be an effective magnetic field sensor, able to retrieve the full vector parameters of the magnetic field. In diamond NV magnetometry, sensitivity is proportional to readout contrast, the number of NV centers interrogated, and material parameters that determine spectral linewidth.

Diamond NV center materials can be a very compact and effective vector magnetometer platform. Because the magnetic field measurement from the diamond NV is dependent only on material constants, measurements are not proportional but absolute and do not require costly and complicated calibration procedures that suffer from drift, which can challenge long-term sensor performance without ground-truth to adjust.

Vector magnetometry is an essential sensing modality for multiple industries, including oil and gas drilling, geological survey, space-based satellites, environmental safety audits, and medical imaging. Compact, stable, and high accuracy magnetometers would be of interest in each of these industries.

Conventionally, a visible wavelength ($\lambda \sim 532$ nm) pump generates light used to promote the NV-centers into an excited state. The resulting spin states are determined by measuring photoluminescence at around $\lambda = 637$-$800$ nm, a process that tends to result in extremely low contrast (<4%), impacting the sensitivity attainable with a given sensor configuration and, due to collection losses, driving high optical power requirements.

Thus, there remains a need for improved systems and methods utilizing diamond NV centers for implementing their use in many of these fields of endeavor.

SUMMARY OF THE INVENTION

Various deficiencies in the prior art are addressed below by the disclosed systems, methods, and apparatus measuring sensitive magnetic fields through coupled pump/probe fields associated with an NV diamond material within a resonant cavity while controlling beam power and frequency fluctuations.

A magnetometer according to one embodiment of the invention comprises a resonant cavity comprising a first mirror positioned at a first end of the resonant cavity and a second mirror positioned at a second end of the resonant cavity, the second end opposing the first end; a nitrogen vacancy (NV) diamond material positioned in the resonant cavity between the first and second mirrors; an excitation beam source configured to direct an excitation beam into the resonant cavity, the excitation beam configured to excite the NV diamond material from a ground state to an excited state; a probe beam source configured to direct a probe beam into the resonant cavity, the probe beam configured to probe an intermediate singlet state of the NV diamond material; a radio frequency (RF) source configured to emit RF radiation with a photon energy resonant with transition energy between ground and excited state of the NV diamond material; and a photodetector, configured to measure probe beam power; wherein a strength and direction of a magnetic field proximate the NV diamond material may be determined using probe beam measurements.

A magnetometer according to another embodiment of the invention comprises a resonant cavity having nitrogen vacancy (NV) diamond material positioned therein to receive therethrough an excitation beam and a probe beam, the NV doped diamond material reaching an excitation spin state in response to the excitation beam, and having an intermediate singlet state population probed by the probe beam to derive therefrom a determination of magnetic field strength and direction; a dichroic mirror positioned to receive the excitation and probe beams from the NV doped diamond material and direct beam wavelengths associated with the probe beam to a photodetector, the photodetector responsively providing a monitoring signal indicative of a power of the probe beam; and a first controller, configured to reduce probe beam power fluctuations by correspondingly adapting a control signal associated with at least one of probe beam power and excitation beam power.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

The following description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for illustrative purposes to aid the reader in understanding the principles of the invention and the concepts contributed by the inventor(s) to furthering the art and are to be construed as being without limitation to such specifically recited examples and conditions.

Various embodiments provide an improved diamond NV magnetometer having higher sensitivity and lower power requirements using new arrangements of readily available magnetometer components. In particular, it is noted that conventional NV diamond magnetometers based on photoluminescence operating at room temperatures have a sensitivity around 100 pT/Hz, which is roughly operating at 1000's of times the spin projection limit. However, various embodiments discussed herein contemplate use of laser-cavity enhanced absorption-based magnetometry capable of lowering this by approximately a factor of 500, bringing the sensitivity <1 pT/Hz. This is enabled in part through the use of a stabilized signal removing unwanted noise from the measurement scheme.

Unlike conventional arrangements wherein a NV diamond material is used for making magnetic field measurements based upon emissions from an NV diamond material within a cavity, the various embodiments utilize techniques based on transmissions from an NV diamond material within a laser cavity.

Figure 1:
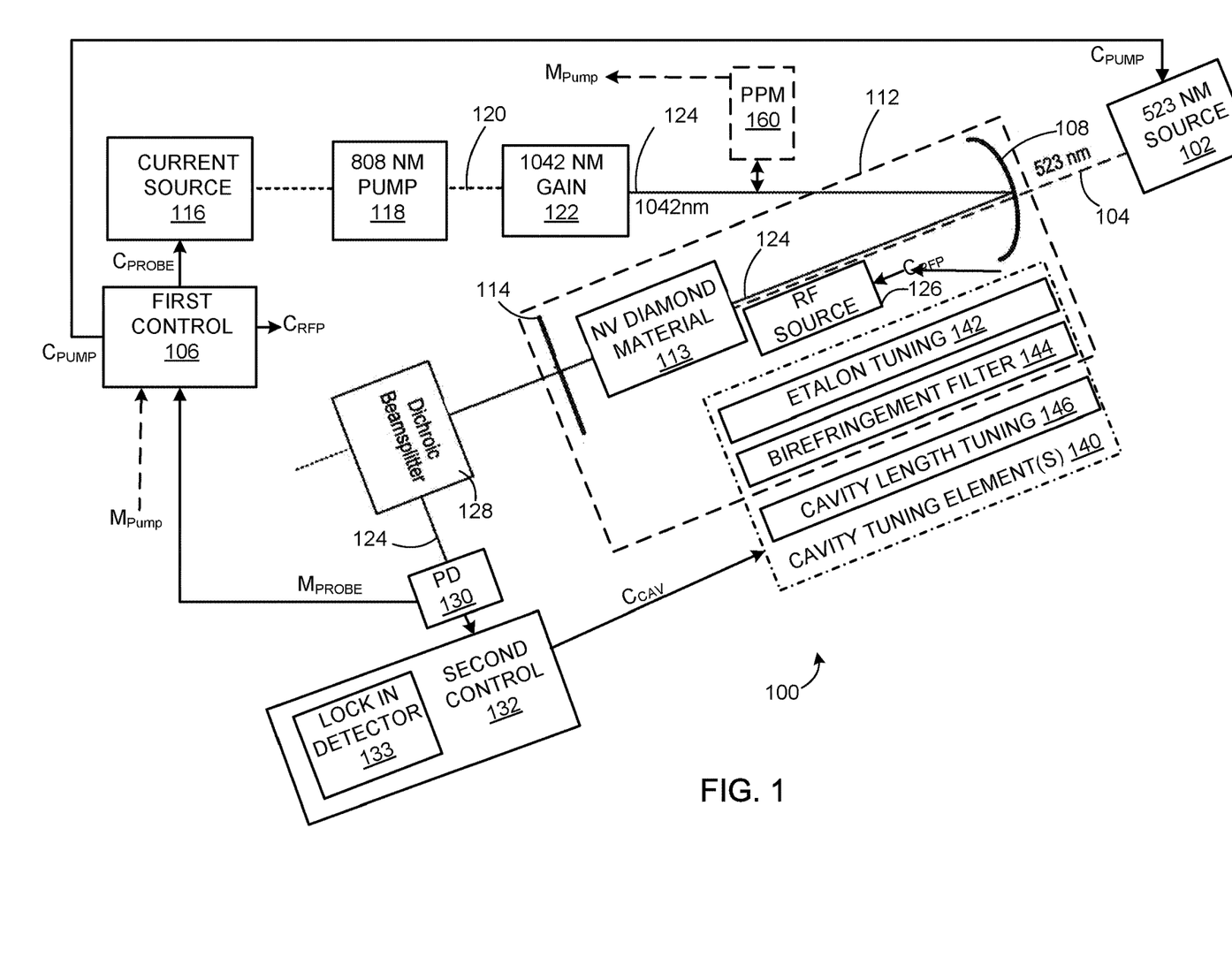
FIG. 1 depicts a magnetic sensor system according to one embodiment of the present invention.

FIG. 1 depicts a magnetic sensor system 100 according to one embodiment of the present invention. Specifically, the magnetic sensor system 100 of FIG. 1 comprises a laser cavity magnetometer including a laser system having a secondary laser wavelength used to monitor and control probe power, or to sample and compensate for system noise, according to one or more embodiments. The system 100 of FIG. 1 uses a nitrogen vacancy (NV) diamond material comprising a plurality of NV centers configured as a magnetic sensor system that uses fluorescence intensity to distinguish the ms=±1 states, and to measure the magnetic field strength and direction based on the energy difference between the ms=+1 state and the ms=−1 state.

The system 100 includes an optical excitation source 102 configured to pump a first light beam 104 (e.g., $\lambda_{EX}$=523 nm) at a power level determined in response to a control signal $C_{PUMP}$ generated by a first controller 106. The first light beam 104 is directed through a fold mirror 108 to an NV diamond material 113 within a resonant cavity 112 formed between the fold mirror 108 and an end mirror 114 and providing, thereby, a high-Q resonator operative to cause photons within the resonant cavity 112 to be recycled many times through the NV diamond material 113.

The NV diamond material 113 has a ground state, an excited state, and an intermediate singlet state. The exemplary 523 nm optical signal (other suitable wavelengths may be used, such as 532 nm) of the first light beam 104 excites the NV diamond material 113 from the ground state to the excited state such that it passes through the intermediate singlet state while being probed by a 1042 nm optical signal.

A current source 116 is configured to excite an 808 nm optical pump 118 (e.g., an 808 nm laser) in response to a control signal $C_{PROBE}$ generated by the first controller 106. The 808 nm output 120 of the optical pump 118 is coupled to a 1042 nm gain block 122, which responsively provides a 1042 nm output beam 124 that is directed into the resonant cavity 112 via the fold mirror 108. The 532 nm beam 104 (excitation beam) and 1042 nm beam 124 (probe beam) within the resonant cavity 112 have substantially similar paths therein as they are directed back and forth between the fold mirror 108 and the end mirror 114 so as to pass through the NV diamond material 113 multiple times (i.e., recycled therethrough).

An RF excitation source 126 within the resonant cavity 112 provides RF radiation to the NV diamond material 113 at a power level determined in response to a control signal $C_{RFP}$ generated by the first controller 106.

Light from the NV diamond material 113 is directed to a dichromic beamsplitter 128 configured to direct the 1042 nm beam 124 to a photodetector 130, which provides a measurement of the power of the 1042 nm beam 124 $M_{PROBE}$ to the first controller 106 and a second controller 132.

The RF excitation source 126 may comprise a loop of wire, microstrip, waveguide, or other powered antenna to conduct an RF signal (e.g., received from a function generator and/or RF amplifier) so as to generate an RF field in proximity of the diamond NV material 113.

The RF excitation source 126, when emitting RF radiation with a photon energy resonant with the transition energy between ground ms=0 spin state and the ms=+1 spin state, excites a transition between those spin states. For such a resonance, the spin state cycles between ground ms=0 spin state and the ms=+1 spin state, reducing the population in the ms=0 spin state and reducing the overall fluorescence at resonances. Similarly, resonance occurs between the ms=0 spin state and the ms=−1 spin state of the ground state when the photon energy of the RF radiation emitted by the RF excitation source 126 is the difference in energies of the ms=0 spin state and the ms=−1 spin state, or between the ms=0 spin state and the ms=+1 spin state, there is a decrease in the fluorescence intensity.

The optical excitation source 102 may be a laser or a light emitting diode, for example, which emits green light, illustratively 523 nm light used as an optical excitation beam 104. The optical excitation beam 104 induces in the NV diamond material 113 a fluorescence in the red, which corresponds to an electron transition of the NV diamond material 113 from the excited state to the ground state. Light from the NV diamond material 113 is directed through dichroic beamsplitter 128 to filter out light in the excitation band (in the green wavelength band, for example), and to pass other light such as the 1042 nm probe beam 124, which in turn is detected by the detector 130.

The optical excitation light source 102, in addition to exciting fluorescence in the NV diamond material 113, also serves to reset the population of the ms=0 spin state of the ground state to a maximum polarization, or other desired polarization.

For continuous wave excitation, the optical excitation source 102 continuously pumps the NV centers of the NV diamond material 113, and the RF excitation source 126 sweeps across a frequency range that includes the zero splitting (when the ms=±1 spin states have the same energy) photon energy of 2.87 GHz.

The fluorescence for an RF sweep corresponding to the diamond material 113 with NV centers aligned along a single direction for different magnetic field components Bz along the NV axis, where the energy splitting between the ms=−1 spin state and the ms=+1 spin state increases with Bz. Thus, the component Bz may be determined.

In general, the NV diamond material 113 will have NV centers aligned along directions of four different orientation classes, and thus along the four different crystallographic axes of diamond.

In a single-pass of light through the NV diamond material 113, which often traverses only 10s of microns, the change in absorption from on- and off-resonance can be very small such that detection is difficult. However, detection of this change is enhanced through the addition of optical gain due to recycling beams through the NV diamond material 113 within the high-Q resonator formed with resonant cavity 112, which enhances detection by making up for unwanted cavity losses through corresponding realized optical gain. When the optical pump 118 is operated near threshold, the contrast increase approaches unity, further approaching a spin-projection limit.

Operating a laser cavity near threshold results in alternating sequence of continuous wave (CW) and chaotic behavior, referred to as a bifurcation cascade. This instability noise can result in challenges differentiating this chaotic behavior from oscillations due to magnetic field changes. However coupling the pump to the readout wavelength through a proportionality relation can result in a more stable cavity design, suppressing the chaotic behavior thus making it easier to differentiate between bifurcation cascade and sensed magnetic field measurements.

In order to increase the contrast, various embodiments use additional mechanisms to measure the NV diamond quantum state; in particular, the use of an intermediate singlet state, which preferentially depletes the excited spin state can be probed through absorption of the singlet levels. Specifically, the various embodiments measure the NV diamond quantum state using an intermediate singlet state, which preferentially depletes the excited spin state and can be probed through absorption of the singlet levels. By probing the relative populations of the intermediate singlet state ($\lambda_{PROBE}$=1042 nm) via absorption, the collection efficiency can approach unity, which also improves performance relative to collecting photoluminescence which is emitted into nearly 4 pi (4 π) steradians and only collected over a small solid angle.

The magnetic sensor system 100 of FIG. 1 is configured to effectively stabilize the relevant transmissions of the NV diamond material 113 so at to achieve sufficient signal output without "stabilizing away" the signal to be measured (i.e., keep the signal output stable without removing noise therein, which noise includes the signal to be measured).

As previously noted, the first controller 106 is configured to provide power stabilization of the 1042 nm probe beam 124, while the second controller 132 is configured to provide frequency stabilization of the 1042 nm probe beam 124. Such power and frequency stabilization is directed to stabilizing the relevant transmissions of the NV diamond material so as to ensure accurate measurements of changes in such transmission (e.g., intensity changes) caused by changes in magnetic field(s) being measured.

The effective cavity length of the resonator 112 may change to due temperature, vibrations, and/or other factors. Changes in effective cavity length may be seen be frequency and/or power drift. As such, to keep the effective length substantially the same, a mechanism is provided to increase or decrease a mirror-to-mirror distance (i.e., a distance between the fold mirror 108 and end mirror 114) so as to maintain a specific or desired effective cavity length, wherein that mechanism is controlled by drift or change in frequency and/or power.

One of the goals of the illustrated embodiment is to pump power near to threshold pump power (e.g., 808 nm pump at 1 W for a particular laser cavity), which depends on the variety of laser pump that is used.

In various embodiments, two sets of control loops may be provided, wherein each control loop set includes at least one proportional-integral-derivative (PID) control loop, each control loop being managed by a respective one of the first 106 and second 132 controllers.

In a first set of control loops, a power lock loop is provided wherein changes in the output power as indicated by the PD 130 are processed by the first controller 106 operating as a PID controller to responsively adjust one or more of the output level of current source 116, bias of RF source 126 (slow adjust, approximately 10 Hz), or of optical excitation source 102.

In a second set of control loops, peak and/or side lock loops may be provided wherein changes in the output power as indicated by photodetector (PD) 130 are processed by the second controller 132 operating as a PID controller to responsively control, illustratively, a piezo cavity length tuning module 146 so as to adjust the length of the resonator 112 (fast adjust, 1 to 10 kHz speed).

In various embodiments, differentiating between signal and noise may be accomplished via a temporal filter implemented via operation of one or both of the first and second controllers 106 and 132, wherein slow moving changes are related to laser cavity changes and fast moving changes are associated with magnetic field changes.

Fast signals may be deemed to be related to frequency tuning (e.g., greater than ~10 kHz), whereas slow signals (e.g., less than ~10 Hz) may be deemed to be related to thermal/vibrational tuning.

In various embodiments, noise is mitigated via the operation of the first and second controllers 106 and 132 to apply automatic compensation in response to specific changes in signal measurements.

The first controller 106 is configured to provide power stabilization of the 1042 nm probe beam (i.e., reduce probe beam power fluctuations). The first controller 106 operates to adjust the control signals $C_{PUMP}$, $C_{PROBE}$, and $C_{RFP}$ in response to indications of power instability associated with the 1042 nm probe beam 124. Specifically, the first controller 106 receives a probe power indicative signal $M_{PROBE}$, illustratively the 1042 nm light from the dichroic beamsplitter 128, and detects fluctuations in the power associated with the probe power indicative signal $M_{PROBE}$. In response to fluctuations in probe power, the first controller 106 may adapt one or more control signals that are configured to modify different portions of the system 100 in various embodiments as described herein. In various embodiments the first controller 106 is configured to adapt at least one of probe beam power and excitation beam power in accordance with a PID control loop.

Various embodiments use a pump power monitoring circuit such as photodetector (e.g. Si) to monitor the power of the 1042 nm wavelength and control the drive current to an external pump laser. As depicted in FIG. 1, an optional pump power monitor (PPM) circuit 160 is shown as monitoring the power of the 1042 nm beam generated by the 1042 nm gain block 122 and responsively generating a measurement of the power of the 1042 nm beam 124 $M_{PUMP}$ for the first controller 106 and, optionally, the second controller 132. The PPM 160 may comprise any suitable optical beam power sampling/sensing mechanism, such as a dichroic mirror for sampling a portion of a beam and a photodetector for measuring a power level associated with the sampled beam portion.

The operation of the first controller 106 will be discussed in more detail below with respect to FIGS. 3A-3C.

The second controller 132 is configured to provide frequency stabilization of the 1042 nm probe beam 124. The second controller 132 operates to adjust via a control signal $C_{CAV}$ one or more cavity tuning elements 150 which may be associated with the resonant cavity 112. Specifically, the cavity tuning elements 140 may comprise etalon tuning elements 142 within the cavity 112, birefringent filter elements 144 within the cavity 112, cavity length tuning elements 146 and combinations thereof. For example, frequency stabilization may be provided via peak or side locking techniques using piezo cavity length tuning elements 146, such as a linear actuator controlling the position of the fold mirror 108 so as to change the distance between the fold mirror 108 and end mirror 114, thereby effectively increasing or decreasing the length of the resonant cavity 112 formed therebetween. In various embodiments the second controller 132 is configured to reduce frequency fluctuation in accordance with a PID control loop. It is noted that feedback to the piezo cavity length tuning element 146 would adjust phase (frequency) of the cavity 112, feedback to the 808-nm pump 118 would adjust the DC signal of the IR field, and feedback to the RF source 126 would adjust the AC signal of the IR field.

Figure 2:
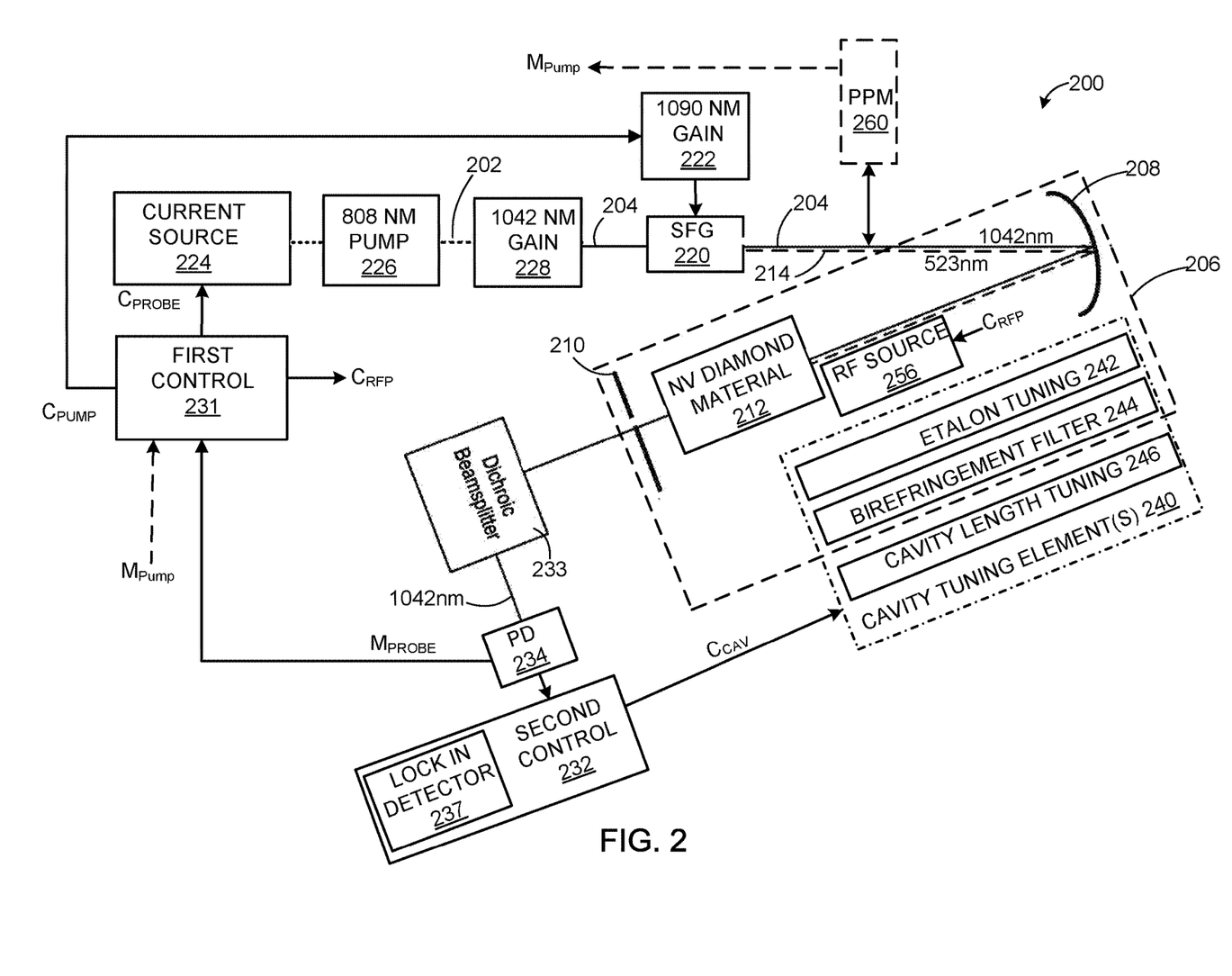
FIG. 2 depicts a magnetic sensor system according to another embodiment of the present invention.

FIG. 2 depicts a magnetic sensor system 200 according to another embodiment of the present invention. The magnetic sensor system 200 of FIG. 2 is similar to that of the magnetic sensor system 100 of FIG. 1. The system 200 of FIG. 2 contemplates that the 532 nm beam 204 (excitation beam) and 1042 nm beam 214 (probe beam) within the resonant cavity 206 have substantially similar paths therein as they are directed back and forth between the fold mirror 208 and the end mirror 210 so as to pass through the NV diamond material 212 multiple times (i.e., recycled therethrough).

A current source 224 is configured to excite an 808 nm optical pump 226 (e.g., an 808 nm laser) in response to a control signal $C_{PROBE}$ generated by a first controller 230. The 808 nm output beam 202 of the 808 nm optical pump 226 is coupled to a 1042 nm gain block 228, which responsively provides a 1042 nm output beam 204 that is directed to a sum and frequency generation (SFG) crystal 220. The SFG crystal is configured to generate (e.g., via a 2-photon process) a 523 nm output beam 214 in response to the received 1042 nm beam 204 and a SFG programming beam, illustratively a 1090 nm beam received from a 1090 nm gain block 222. The 1090 nm beam is generated by the 1090 nm gain block 222 in response to a control signal $C_{PUMP}$ generated by the first controller 230. The 1042 nm beam 204 passes through the SFG 220 and is directed in parallel with the 523 nm beam toward the fold mirror 208, which directs both beams 204, 214 to the end mirror 210 and through the NV diamond material 212. It is noted that in the event of using excitation and/or probe beams of different wavelengths, the programming beam may be of a different wavelength than 1090 nm (i.e., the 1090 gain block 222 may comprise a gain block associated with a different wavelength).

An RF excitation source 256 within the resonant cavity 206 provides RF radiation to the NV diamond material 212 at a power level determined in response to the control signal $C_{RFP}$ generated by the first controller 231 and coupled to the 1090 nm gain block 222. In this manner, the first controller 231 controls the output power of the 1090 nm output beam generated by the 1090 nm gain block 222 and used by the SFG 220 to provide the 523 nm output beam 214.

Light from the NV diamond material 212 is received by a dichromic beamsplitter 233 configured to direct the 1042 nm beam 204 to a photodetector 130, which provides a measurement of the power of the 1042 nm beam 204 $M_{PROBE}$ to the first controller 231 and a second controller 232.

The RF excitation source 126 may comprise a loop of wire, microstrip, waveguide, or other powered antenna to conduct an RF signal (e.g., received from a function generator and/or RF amplifier) so as to generate an RF field in proximity of the diamond NV material 212.

The RF excitation source 126, when emitting RF radiation with a photon energy resonant with the transition energy between ground ms=0 spin state and the ms=+1 spin state, excites a transition between those spin states. For such a resonance, the spin state cycles between ground ms=0 spin state and the ms=+1 spin state, reducing the population in the ms=0 spin state and reducing the overall fluorescence at resonances. Similarly, resonance occurs between the ms=0 spin state and the ms=-1 spin state of the ground state when the photon energy of the RF radiation emitted by the RF excitation source 126 is the difference in energies of the ms=0 spin state and the ms=-1 spin state, or between the ms=0 spin state and the ms=+1 spin state, there is a decrease in the fluorescence intensity.

In various embodiments, noise is mitigated via the operation of the first and second controllers 231 and 232 to apply automatic compensation in response to specific changes in signal measurements.

The first controller 231 is configured to provide power stabilization of the 1042 nm probe beam. The first controller 231 operates to adjust the control signals $C_{PUMP}$, $C_{PROBE}$, and $C_{RFP}$ in response to indications of power instability associated with the 1042 nm probe beam 204. Specifically, the first controller 231 receives a probe power indicative signal $M_{PROBE}$, illustratively the 1042 nm light from the dichroic beamsplitter 128, and detects fluctuations in the power associated with the probe power indicative signal $M_{PROBE}$. In response to fluctuations in probe power, the first controller 231 may adapt one or more control signals that are configured to modify different portions of the system 200 in various embodiments as described herein. In various embodiments the first controller 231 is configured to adapt at least one of probe beam power and excitation beam power in accordance with a PID control loop.

Various embodiments use a pump power monitoring circuit such as photodetector (e.g. Si) to monitor the power of the 1042 nm wavelength and control the drive current to an external pump laser. As depicted in FIG. 2, an optional pump power monitor (PPM) circuit 260 is shown as monitoring the power of the 1042 nm beam generated by the SFG 220 and responsively generating a measurement of the power of the 1042 nm beam 124 $M_{PUMP}$ for the first controller 231 and, optionally, the second controller 232.

The operation of the first controller 106 will be discussed in more detail below with respect to FIGS. 3A-3C.

The second controller 232 is configured to provide frequency stabilization of the 1042 nm probe beam 124. The second controller 132 operates to adjust one or more cavity tuning elements 240 which may be associated with the resonant cavity 206. Specifically, the cavity tuning elements 240 may comprise etalon tuning elements 242 within the cavity 206, birefringent filter elements 244 within the cavity 206, cavity length tuning elements 246 and combinations thereof. For example, frequency stabilization may be provided via peak or side locking techniques using piezo cavity length tuning elements 246, such as a linear actuator controlling the position of the fold mirror 208 so as to change the distance between the fold mirror 208 and end mirror 210, thereby effectively increasing or decreasing the length of the resonant cavity 206 formed therebetween. In various embodiments the second controller 232 is configured to reduce frequency fluctuation in accordance with a PID control loop. It is noted that feedback to the piezo cavity length tuning element 146 would adjust phase (frequency) of the cavity 112, feedback to the 808-nm pump 118 would adjust the DC signal of the IR field, and feedback to the RF source 126 would adjust the AC signal of the IR field.

Figure 3A:
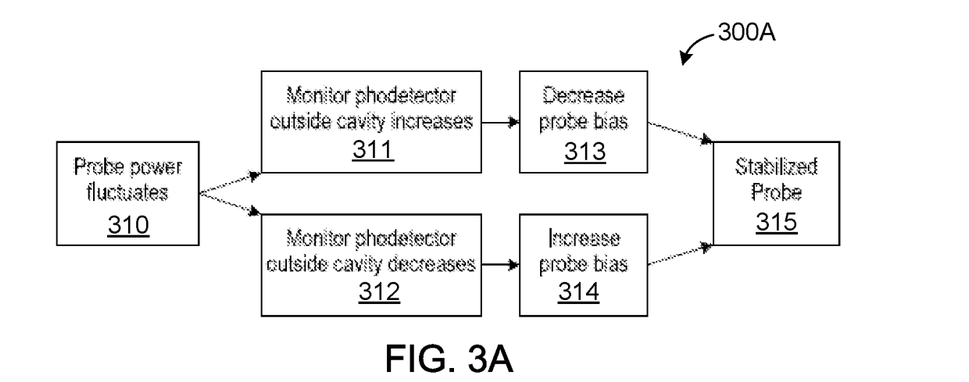
FIGS. 3A-3C are flow diagrams illustrating a method of probe stabilization according to three embodiments of the present invention.
Figure 3B:
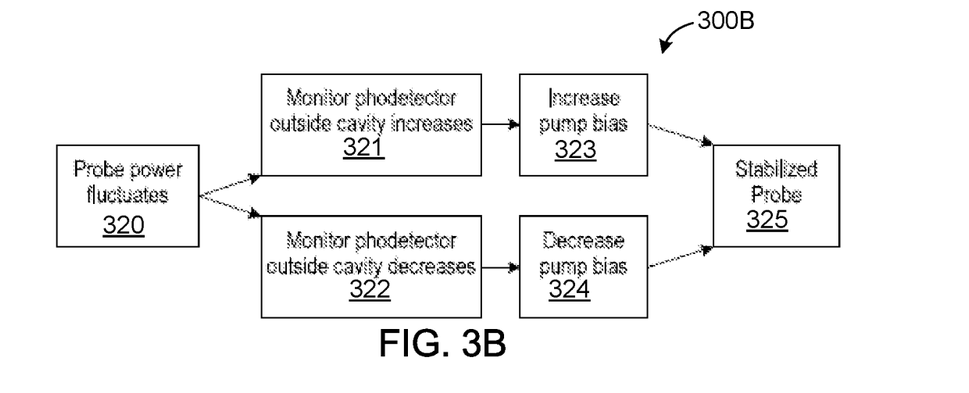
Figure 3C:
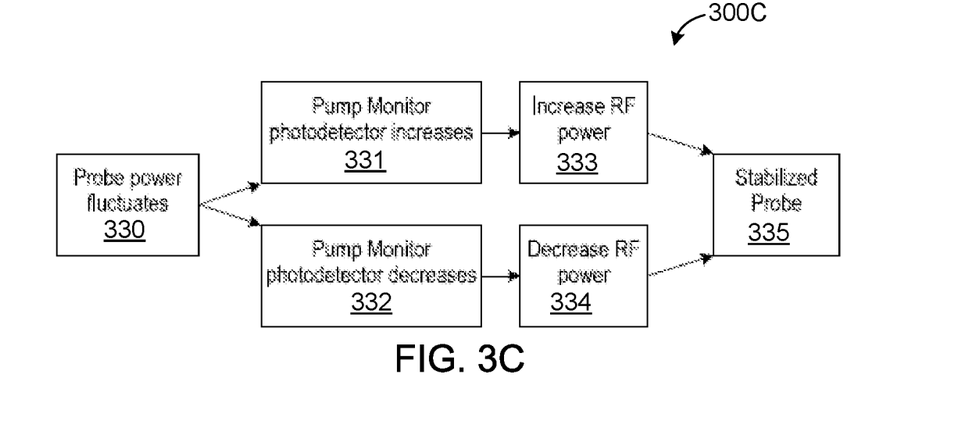

FIGS. 3A-3C depict flow diagrams of probe stabilization methods according to various embodiments of the present invention. In particular, FIGS. 3A-3C depict various methods for stabilizing relevant transmissions of the NV diamond material by adapting one or more of probe bias, pump bias, and RF power in response to a probe power fluctuation. A power probe fluctuation may be indicated by an increase or decrease in measured probe power ($M_{PROBE}$) or measured pump power ($M_{PUMP}$). The methods 300A-300C of FIGS. 3A-3C are suitable for implementation individually or in any combination via the various controllers described above with respect to the systems 100, 200 FIGS. 1-2.

Referring to FIG. 3A, responsive to a determination of a power probe fluctuation (310): if there has been an increase in measured probe power $M_{PROBE}$ (311) then probe bias $C_{PROBE}$ is decreased (step 313) to achieve thereby a stabilized probe power level (315); if there has been a decrease in measured probe power $M_{PROBE}$ (312) then probe bias $C_{PROBE}$ is increased (step 314) to achieve thereby a stabilized probe power level (315).

Referring to FIG. 3B, responsive to a determination of a power probe fluctuation (320): if there has been an increase in measured probe power $M_{PROBE}$ (321) then pump bias $C_{PUMP}$ is increased (323) to achieve thereby a stabilized probe power level (325); if there has been a decrease in measured probe power $M_{PROBE}$ (322) then pump bias $C_{PUMP}$ is decreased (324) to achieve thereby a stabilized probe power level (315).

Referring to FIG. 3C, responsive to a determination of a power probe fluctuation (330): if there has been an increase in measured pump power $M_{PUMP}$ (331) then RF power $C_{RFP}$ is increased (333) to achieve thereby a stabilized probe power level (325); if there has been a decrease in measured pump power $M_{PUMP}$ (332) then RF power $C_R$FP is decreased (334) to achieve thereby a stabilized probe power level (315).

Various embodiments described herein provide PID frequency stabilization, peak locking for frequency stabilization, and/or side locking for frequency stabilization, wherein these frequency stabilization techniques may be performed in parallel with various power stabilization techniques. As discussed above, such frequency stabilization may be provided via the second controllers 132,232 of FIGS. 1-2.

Referring again to FIGS. 1-2, to examine a strength and direction of a magnetic field proximate an NV diamond material, the system 100 of FIG. 1 or 200 of FIG. 2 applies the excitation beam 114,214 and a pulsed RF field via the RF source 126,256 to the NV diamond material 113,212, which causes the NV diamond material 113,212 to change quantum states as described herein. The intermediate singlet state, which preferentially depletes the excited spin state, is probed through absorption of the singlet levels via the probe beam 124,204.

Specifically, the pulsed RF field applied to the NV diamond material modulates thereby the absorption of the singlet levels, and an AC-coupled signal associated with the probe beam 124,204 is measured by the PD 130,234 during peaks of the RF pulses as determined by, for example, a lock-in detector 137,237 within the second controller 132, 232. That is, the lock-in detector 137,237 coordinates RF field pulses (e.g., less than 10 kHz pulses, illustratively derived from a tuning signal such as a tuning signal between 1 to 5 kHz applied to the RF field generated by the RF source.

Various embodiments described herein provide PID power stabilization and PID frequency stabilization as discussed herein. Various frequency locking or frequency stabilization techniques may be employed, such as peak locking (measuring changes in transmission peak timing and/or related amplitude fluctuations) and/or side locking (using the slope on either side of the transmission peak to convert frequency fluctuations into amplitude fluctuations, which are subsequently detected by a photodiode) for frequency stabilization, wherein these frequency stabilization techniques may be performed in parallel with various power stabilization techniques. As discussed above, such frequency stabilization may be provided via the second controller 132,232.

It is noted that peak locking is inherently insensitive to power fluctuations related to magnetic field sensing. This technique may comprise applying a greater than 100 kHz modulated signal on the output of the laser that phase shifts the signal. That phase shifted signal is sent through a narrow band absorber (atomic or molecular gas, or Fabry Perot cavity), which results the alignment of the laser spectral peak and reference cavity peak aligning at a zero crossing (shifting from positive to negative slope of a differential measurement) in the signal. This technique is only sensitive to frequency shifts.

To examine a magnetic field signal, a pulsed RF field is applied to the NV diamond material, which modulates the absorption. The AC-coupled signal is read out or measured at a lock-in detector tuned to a 1 to 5 kHz signal applied to the RF field.

The peak locking technique modulates the output of the laser, so that will have no impact on the signal.

Other probe power deviations may be due to thermal drifts, which are typically less than 10 Hz, but can be responsive up to −100 Hz. The output signal of the RF field may be electronically measured when turned off (50% duty cycle) so that the controllers 105 are not responding to changes in output power due to magnetic field, since the magnetic field will not modify diamond absorption if no RF field is applied.

Various embodiments comprise a laser cavity magnetometer where the RF pump, the probe beam source, and the excitation beam source powers are coupled to each other through electronic or optical means. The power of the probe may be monitored via photodetector and used to control the bias of a probe excitation source and/or control the bias of an optical pump. The pump may be generated via nonlinear means (e.g. second harmonic generation) directly from the probe wavelength. The nonlinear means may comprise intracavity component(s). The pump may be generated via nonlinear means (e.g. sum frequency generation) from the probe wavelength and another laser. The probe wavelength and another laser may share a fraction of the cavity and be mixed via one or more intracavity components. A method of making such components may be by using an existing laser operating at 1042 nm (e.g. using Yb solid state laser or InGaAs semiconductor laser). NV diamond material is introduced into the cavity and a microwave field near the NV diamond to excite and optically detect the magnetic resonance signal (ODMR).

Various embodiments use an intracavity nonlinear crystal (e.g. BBO) to generate second harmonic generation which is used to pump the NV diamond material.

Various embodiments use a T-VECSEL which has two independent gain regions that share a portion of the same cavity and can be mixed through sum-frequency generation to pump the diamond using, e.g. a BBO crystal.

Various embodiments are formed or integrated onto a shared platform.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

In the preceding detailed description of exemplary embodiments of the invention, specific exemplary embodiments in which the invention may be practiced are described in sufficient detail to enable those skilled in the art to practice the disclosed embodiments. For example, specific details (such as specific method orders, structures, elements, and connections) have been presented herein. However, it is to be understood that the specific details presented need not be utilized to practice embodiments of the present invention. It is also to be understood that other embodiments may be utilized and that logical, architectural, programmatic, mechanical, electrical and other changes may be made without departing from general scope of the invention. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

What is claimed is:

1. A magnetometer, comprising:
   a resonant cavity comprising a first mirror positioned at a first end of the resonant cavity and a second mirror positioned at a second end of the resonant cavity, the second end opposing the first end;
   a nitrogen vacancy (NV) diamond material positioned in the resonant cavity between the first and second mirrors;
   an excitation beam source configured to direct an excitation beam into the resonant cavity, the excitation beam configured to excite the NV diamond material from a ground state to an excited state;
   a probe beam source configured to direct a probe beam into the resonant cavity, the probe beam configured to probe an intermediate singlet state of the NV diamond material;
   a radio frequency (RF) source configured to emit RF radiation with a photon energy resonant with transition energy between ground and excited state of the NV diamond material;
   a photodetector, configured to measure probe beam power; and
   a first controller, configured to reduce probe beam power fluctuations by correspondingly adapting a control signal associated with at least one of probe beam power and excitation beam power;
   wherein a strength and direction of a magnetic field proximate the NV diamond material may be determined using probe beam measurements,
   the first controller is configured to adapt at least one of probe beam power and excitation beam power in accordance with a proportional-integral-derivative (PID) control loop, and
   the first controller PID control loop is further responsive to changes of the RF radiation power level.

2. The laser cavity magnetometer of claim 1, wherein the first controller PID control loop is responsive to changes of a 532-nm excitation beam.

3. The magnetometer of claim 1, further comprising a second controller, configured to reduce probe beam power fluctuations by correspondingly adapting a control signal associated with a resonant cavity tuning element.

4. The magnetometer of claim 3, wherein the second controller is configured to adapt the resonant cavity tuning element in accordance with a proportional-integral-derivative (PID) control loop responsive to changes in power level over approximately 10 KHz.

5. The magnetometer of claim 4, wherein the second controller is configured to use at least one of peak locking and side locking as part of the PID control loop.

6. The magnetometer of claim 3, wherein the resonant cavity tuning element comprises an etalon tuning element within the resonant cavity.

7. The magnetometer of claim 3, wherein the resonant cavity tuning element comprises a birefringent filter within the resonant cavity.

8. The magnetometer of claim 1, wherein the excitation beam comprises a green wavelength beam, and the probe beam comprises an approximately 1042 nm beam.

9. The magnetometer of claim 1, wherein the first mirror comprises a fold mirror and the second mirror comprises an end mirror, the excitation beam source positioned to direct the excitation beam through the fold mirror toward the end mirror, the probe beam source positioned to direct the probe beam to an inner surface of the fold mirror for reflection thereby toward the fold mirror.

10. The magnetometer of claim 1, wherein the RF field is pulsed at between approximately 1 kHz and 5 kHz, and probe beam measurements are taken during pulse peak.

11. The magnetometer of claim 1, further comprising a lock-in detector configured to synchronize probe beam measurements with RF field pulse peaks.

12. The magnetometer of claim 1, further comprising a sum and frequency generation (SFG) crystal configured to generate the excitation beam in response to a received beam of the same wavelength as the probe beam and a programming beam having a wavelength selected to cause the SFG to generate a green wavelength excitation beam in response to the wavelength of the probe beam.

13. The magnetometer of claim 11, wherein the probe beam has a wavelength of approximately 1042 nm and the programming beam has a wavelength of approximately 1090 nm.

14. A magnetometer, comprising:
 a resonant cavity having nitrogen vacancy (NV) diamond material positioned therein to receive therethrough an excitation beam from an excitation beam source and a probe beam from a probe beam source, the NV doped diamond material reaching an excitation spin state in response to the excitation beam, and having an intermediate singlet state population probed by the probe beam to derive therefrom a determination of magnetic field strength and direction;
 a dichroic mirror positioned to receive the excitation beam and the probe beam from the NV doped diamond material and direct beam wavelengths associated with the probe beam to a photodetector, the photodetector responsively providing a monitoring signal indicative of a power of the probe beam;
 a radio frequency (RF) source configured to emit RF radiation with a photon energy resonant with transition energy between ground and excited state of the NV diamond material;
 a first controller, configured to reduce probe beam power fluctuations by correspondingly adapting a control signal associated with at least one of probe beam power and excitation beam power; and
 a sum and frequency generation (SFG) crystal configured to generate the excitation beam in response to a received beam of the same wavelength as the probe beam and a programming beam having a wavelength selected to cause the SFG to generate a green wavelength excitation beam in response to the wavelength of the probe beam.

15. The magnetometer of claim 14, wherein the excitation beam comprises a green wavelength beam, and the probe beam comprises an approximately 1042 nm beam.

16. The magnetometer of claim 14, further comprising a fold mirror and the second mirror comprises an end mirror, the excitation beam source positioned to direct the excitation beam through the fold mirror toward the end mirror, the probe beam source positioned to direct the probe beam to an inner surface of the fold mirror for reflection thereby toward the fold mirror.

17. The magnetometer of claim 14, wherein the RF field is pulsed at between approximately 1 kHz and 5 kHz, and probe beam measurements are taken during pulse peak.

18. The magnetometer of claim 14, further comprising a lock-in detector configured to synchronize probe beam measurements with RF field pulse peaks.

* * * * *